United States Patent Office 2,845,340

Patented July 29, 1958

2,845,340

METHOD OF MAKING COMPLEX FERTILIZER

Kurt H. Karbe and Wilhelm F. Boos, Castrop-Rauxel, Westphalia, Germany, assignors to Gewerkschaft Victor, Castrop-Rauxel, Westphalia, Germany No Drawing. Application January 13, 1955
Serial No. 481,689

Claims priority, application Germany January 19, 1954

2 Claims. (Cl. 71—39)

The present invention relates to a method of improving the fluidity of highly ammonized digested phosphate mixtures when making complex fertilizers.

It is a known fact that by breaking up or digesting raw phosphate by means of nitric acid alone or in admixture to other acids and by subsequent neutralization with ammonia, effective complex fertilizers can be obtained. Customarily, the formed calcium nitrate is removed in order to improve the storability of the fertilizer or the said calcium nitrate is converted into a sulphate or carbonate by means of sulphuric acid or carbonic acid respectively. In the last instance the digested mixture has to be made alkaline in order to bind the carbonic acid, and to this end prior to the neutralization process protective means for instance magnesium salts, especially magnesium sulphate, have to be added in order to obtain a good phosphoric acid solubility. During the neutralization and conversion of the calcium nitrate, the digested mass becomes more and more viscous with increasing pH value and finally shows a paste-like consistency. This is particularly pronounced when carbonic acid is employed. The flow properties of the material become worse and worse with increasing absorption of carbonic acid and ammonia. The paste is strongly thixotropic and can be maintained in flowing condition only by very strong stirring action, whereas at those points where no intimate mixture and movement occurs, as for instance in chutes or runways, the paste quickly precipitates and hardens so that the entire flow of the material is disturbed and the entire process may be in danger. Aside from this thixotropic property, a further disadvantage is encountered inasmuch as the carbonization of the paste has to be carried out in a rather diluted condition. Thus, for instance, when carrying out the $CO_2$ process, the concentration of the initially added nitric acid has to be reduced to 40%, or a corresponding quantity of water has to be added so that the operation is effected with a water content of about 40% in the material to be digested. In this way, necessarily a considerable amount of water is introduced into the process which water has additionally to be evaporated in the drying devices. With installations working with a return of the already dried material, accordingly the circulation of this drying material has to be increased many-fold. Due to the requirement to evaporate a larger quantity of water and due to the increased quantity of circulating material, the capacity of such an installation is naturally greatly limited.

When producing potash containing complex fertilizer, customarily the entire potash quantity is added only after completion of the neutralization. Methods according to which potash salt is added already to the material to be digested have been abandoned due to the occurring corrosion.

It is, therefore, an object of the present invention to provide a method of making a complex fertilizer from raw phosphate which will overcome the above mentioned drawbacks.

It is another object of this invention to provide a method of making a complex fertilizer from raw phosphate which can be carried out with considerably lower quantities of water than was heretofore possible with similar methods.

Still another object of this invention consists in the provision of a method of making a complex fertilizer from raw phosphate which will make it possible to carry out the method with considerably smaller quantities of magnesium salts than were heretofore required.

These and other objects and advantages of the invention will appear more clearly from the following description in connection with the examples set forth therein.

The primary feature of the present invention consists in that when making complex fertilizers by digesting raw phosphate by means of nitric acid and by subsequent neutralization by means of ammonia while precipitating dicalcium phosphate, a potash salt such as potassium chloride or potassium nitrate is added to the mixture prior to obtaining a pH value of about 5, preferably 4 to 5 to thereby improve the fluidity and thus to facilitate further transformations. Preferably the potash salt is added in a quantity of 20 to 50% of the employed quantity of raw phosphate.

It is also known to add potash salts to mixtures to be digested of the above mentioned type. This, however, is done only for the purpose of thickening or drying the mass, or for the purpose to give the finished products the desired composition concerning the three main nutritive ingredients.

According to another method of digesting raw phosphate, a phosphate salt was employed for influencing the melting properties of the finished dried end product which is directly obtained from boiled down acetic digested mixtures which are more or less neutralized. In this instance the major portion of the phosphate is represented by water soluble monocalcium phosphate. The calcium nitrate as such remains maintained and is not any longer transformed into a non-hygroscopic substance.

This known method neither makes use of nor conveys the teaching according to the present invention that by addition of a potash salt such as potassium chloride or potassium nitrate and improvement in the fluidity of the mass and thus a facilitation of other transformations can be effected when the time at which this addition is carried out is selected in conformity with the teaching of the invention, i. e. before the mixture reaches a pH value of 5.

By adding a potash salt in conformity with the present invention, the mass becomes considerably thinner so that with the process of the invention it is possible to work with increased nitric acid concentration without causing the mixture to clog when it becomes stiffer. If the fixation of the calcium nitrate is carried out by means of carbonic acid, the further advantage is obtained that the absorption of the carbonic acid is facilitated so that the transformation of calcium nitrate to calcium carbonate is increased and the exploitation of carbonic acid is improved. The result, as will be proved later in connection with examples, is so striking that in case of the above mentioned carbonization, it is feasible to work with a water concentration in the mass to be digested of only 18 to 20% and still to obtain a well flowing thin material, whereas the mixture without the addition of potassium chloride, even with a water content of approximately 40% still remains rather stiff and thixotropic. Thus, without difficulties $HNO_3$-concentrations of over 50% may be employed for the digesting process without the necessity of additionally adding water. With the method employing carbonic acid, it is possible when using the principle of the present invention to reduce the return of the dried material for purposes of granulation from ten times the production (at a water content of 40% in the material to be digested without the addition of KCl) to two to three times the production (at a water content of 18–20% with potassium chloride addition) so that the production in the same installation can be increased by approximately 100%. The improvement obtained by the method according to the invention is particularly impressive with the especially unwelcome properties of the carbonate containing mixtures. However, the method according to the invention can also be appropriately employed when nitric acid or other acids are employed for fixing the calcium nitrate. Also in these circumstances an increased fluidity of the material to be digested is obtained so that it is possible to work with higher concentration and to increase the intermixture by a corresponding installation.

If it is desired to neutralize the digested mixtures above a pH value of 4.5 to 5, as is indispensable for instance when fixing calcium nitrate by means of carbonic acid, a stabilization of the dicalcium phosphate has to be effected for instance by adding magnesium sulphate. The above outlined invention in this connection simultaneously furnishes the advantage that the said stabilizing effect of the added magnesium sulphate is considerably improved by the potash salt and that it is possible to obtain the same effect as with heretofore known methods by means of considerably smaller quantities of magnesium salt.

Whereas for stabilizing the solubility of the phosphate by means of adding magnesium sulphate, merely a quantity of approximately 5 parts by weight MgO to 100 parts by weight of $P_2O_5$ is required, in the presence of potassium chloride in the material to be digested, already a quantity of approximately 10 to 50%, depending on the quantity of the added potash will suffice as will be set forth in the examples following further below. In other words, it is possible with a fertilizer of customary composition when previously adding 20% of the entire quantity of potash, to get along with the magnesium present in the potash salt and to obtain a stabilization of the formed dicalcium phosphate without having additionally to add further magnesium sulphate.

Prior to outlining the invention in detail in connection with some examples, the results of a test obtained according to a heretofore known method may be briefly set forth. 25 kg. of Morocco phosphate were digested with 33.5% $P_2O_5$ with 34 liters of a 52% nitric acid. 2.88 kg. magnesium salt (i. e. 200 mmol MgO/mol $P_2O_5$) were added to the slightly liquid mass to be digested and were neutralized by ammonia up to a pH value of 7.5. Thereupon ammonia and carbonic acid were to be introduced until a pH value of 8.5 would be obtained. The temperature of the mass was maintained at about 60° C. The originally slightly liquid mass became so stiff and viscous during this operation that a stirring was not possible any longer and the absorption of carbonic acid stopped for all practical purposes. The content of the mass in carbonic acid was below 1%. Only after gradually 10 liters water had been added, the mixture again became highly fluid and the $CO_2$ content could be brought down to a final value of 3.2% $CO_2$. The mixture yielded the following analysis:

| | Percent |
|---|---|
| Total N | 10.65 |
| $P_2O_5$ total | 9.05 |
| $P_2O_5$ citrate soluble | 8.78 |
| $H_2O$ | 35.0 |
| MgO | 0.5 |
| $CO_2$ | 3.2 |

To this mixture 40 kg. of potassium chloride with 46% $K_2O$ were added and were granulated with a seven to eight-fold quantity of the same material in already dried condition. A NPK fertilizer is then obtained which has the following composition:

| | Percent |
|---|---|
| Total N | 9.9 |
| $P_2O_5$ total | 8.3 |
| $P_2O_5$ citrate soluble | 8.0 |
| $K_2O$ | 17.8 |

Examples according to the present invention:

*Example I*

25 kg. of Morocco phosphate with 33.4% $P_2O_5$ were digested with 32.5 liters of a 54% nitric acid and were mixed with 2.88 kg. of magnesium sulphate (Epsom salt). Thereupon a neutralization by means of ammonia was carried out up to a pH value of 4.5 and 10 kg. of sodium chloride with 59% of $K_2O$ were added to the mixture. The neutralization was then continued up to a pH value of 7.5 whereupon ammonia and carbonic acid were simultaneously introduced up to a pH value of 8.5, and the $CO_2$ content of the mixture was brought up to a final value of approximately 3.5% $CO_2$. The mass to be digested remained highly liquid throughout the entire digesting operation so that the absorption of carbonic acid and the transformation at a temperature of 60° C. took place smoothly and completely and considerably better and faster than was the case with the above mentioned test according to a heretofore known method according to which the method was carried out without the presence of potassium chloride. The analysis of the mixture obtained according to the above Example I yielded the following result:

| | Percent |
|---|---|
| Total N | 10.80 |
| $P_2O_5$ total | 9.01 |
| $P_2O_5$ citrate soluble | 8.86 |
| $H_2O$ | 20.0 |
| $K_2O$ | 6.5 |
| $CO_2$ | 3.55 |
| MgO | 0.6 |

30 kg. of a 40% potassium chloride were added to this mixture and were granulated with dried material of the same composition for which purpose the three-fold quantity of dry material was sufficient. The otained NPK fertilizer had the following composition:

| | Percent |
|---|---|
| Total N | 10.1 |
| $P_2O_5$ total | 8.18 |
| $P_2O_5$ citrate soluble | 8.05 |
| $K_2O$ | 18.14 |

*Example II*

25 kg. of Morocco phosphate with 33.4% of $P_2O_5$ were digested by means of 34 liters of a 52% nitric acid, mixed with 260 grams of magnesium sulphate (Epsom salt) and neutralized by means of ammonia up to a pH value of about 4.5. 5 kg. of a 59% potassium chloride were then added to the partially neutralized mixture to be digested. The potash salt contained approximately 0.8% MgO so that for the mixture due to the added potassium chloride and magnesium sulphate (Epsom salt), a content of approximately 35 mmol MgO/mol $P_2O_5$ was obtained. Thereupon the neutralization process was continued with ammonia up to a pH value of 7.5, and thereupon $CO_2$ and $NH_3$ up to a pH value of 8.5 and up to a $CO_2$ concentration of about 3.5 were introduced. The mass to be digested remained highly liquid throughout the entire neutralization process so that the ammonia and carbonic acid absorption could occur fast and without any material losses. The mixture had about the following analysis:

| | Percent |
|---|---|
| Total N | 11.8 |
| $P_2O_5$ total | 9.9 |
| $P_2O_5$ citrate soluble | 9.75 |
| $H_2O$ | 24.8 |
| $K_2O$ | 3.5 |
| MgO | 0.09 |
| $CO_2$ | 3.62 |

35 kg. of a 44% potassium chloride were added to the mixture and were granulated with about the three-fold quantity of dried material of the same composition. The obtained NPK fertilizer had the following composition:

| | Percent |
|---|---|
| Total N | 10.0 |
| $P_2O_5$ total | 8.1 |
| $P_2O_5$ citrate soluble | 7.95 |
| $K_2O$ | 17.98 |

*Example III*

25 kg. of a 33.4% Morocco phosphate were digested with 34 liters of a 52% nitric acid and neutralized by means of ammonia up to a pH value of about 4.5. 6 kg. of a 59% potassium chloride were added to the partially neutralized mixture. The potassium chloride had a content of 0.8% magnesium sulphate (Epsom salt) which means a mol ratio for the mixture of about 20 mmol MgO/mol $P_2O_5$. After the potash had been added, the mixture to be digested could be further treated with ammonia and carbonic acid as described in Example I until a pH value of 8.5 and a $CO_2$ content of approximately 3.5 was obtained. The paste remained highly liquid during the entire operation and had the following analysis:

| | Percent |
|---|---|
| Total N | 11.7 |
| $P_2O_5$ total | 9.78 |
| $P_2O_5$ citrate soluble | 9.70 |
| $H_2O$ | 25.3 |
| MgO | 0.05 |
| $CO_2$ | 3.40 |

34 kg. of potassium chloride with 42% $K_2O$ were added to the neutralized mixture, and the mass was granulated with an about three-fold quantity of dried material and was then dried. The obtained NPK fertilizer had the following composition:

| | Percent |
|---|---|
| Total N | 10.07 |
| $P_2O_5$ total | 8.16 |
| $P_2O_5$ citrate soluble | 8.07 |
| $K_2O$ | 18.15 |

The above Examples II and III show that in addition to the improvement of the fluidity and the absorption of carbonic acid due to the presence of the potash salt, also the quantity of the protective means in the form of MgO required during the high-ammonizing operation could be reduced. With these two examples, 35 and 20 mmol MgO/mol $P_2O_5$ will suffice. The fact that in the absence of a potash salt this quantity will not suffice to obtain a good citrate solubility, will be evident from the following example which follows the heretofore known methods and according to which 35 mmol MgO/mol $P_2O_5$ was added without the addition of sodium chloride.

*Example IV*

25 kg. of Morocco phosphate with 33.5% $P_2O_5$ were digested with 42 liters of a 52% nitric acid, and 0.5 kg. of a magnesium salt namely $MgSO_4 \cdot 7H_2O$ were added to the mixture to be digested. For the obtained mixture a mol ratio resulted of approximately 35 mmol MgO/mol $P_2O_5$. The mixture to be digested was then in a manner known per se by means of ammonia and carbonic acid brought to a final pH value of about 8.5. The analysis yielded the following composition:

| | Percent |
|---|---|
| Total N | 11.1 |
| $P_2O_5$ total | 9.3 |
| $P_2O_5$ citrate soluble | 6.15 |
| $H_2O$ | 37.0 |
| MgO | 0.09 |
| $CO_2$ | 3.35 |

40 kg. of a 45% potassium chloride was added to this mixture. The NPK fertilizer granulated with the seven-fold quantity of dried material and subsequently dried had the following composition:

| | Percent |
|---|---|
| Total N | 9.95 |
| $P_2O_5$ total | 8.1 |
| $P_2O_5$ citrate soluble | 5.92 |
| $K_2O$ | 18.05 |

The method according to the invention may also be employed when instead of nitric acid, a mixture of nitric acid with other acids such as sulphuric acid is employed. In connection herewith the following example is set forth:

*Example V*

25 kg. of Morocco phosphate with 33.5% $P_2O_5$ was digested with 31 liters of a 56% nitric acid and was neutralized by means of ammonia up to a pH value of about 3.5. Thereupon 3.25 liters of a 96% sulphuric acid was gradually added while simultaneously ammonia was introduced. Subsequently the neutralization was continued by means of ammonia alone. At a pH value of about 4.0 to 4.5, 10 kg. of a 59% potassium chloride were added to the mixture to be digested, and the neutralization was stopped at a pH value of about 4.9 to 5. The paste which without the addition of KCl at this point of the process was rather tough and stiff remained highly liquid after the addition of potassium chloride and could easily be further processed. The mixture had the following analysis:

| | Percent |
|---|---|
| Total N | 12.0 |
| Total $P_2O_5$ | 9.8 |
| Citrate soluble $P_2O_5$ | 9.7 |
| $K_2O$ | 6.8 |
| $H_2O$ | 20.0 |

40 kg. of potassium chloride with 46% $K_2O$ were added to this mixture and were granulated with about the three-fold quantity of already dried material of the same composition. A NPK fertilizer was then obtained which had the following composition:

| | Percent |
|---|---|
| Total N | 9.8 |
| Total $P_2O_5$ | 8.0 |
| Citrate soluble $P_2O_5$ | 7.9 |
| $K_2O$ | 17.8 |

The employment of potassium nitrate instead of potassium chloride will be set forth by the following example:

*Example VI*

25 kg. of Morocco phosphate with 33.4% $P_2O_5$ were digested with 32.5 liters of a 54% nitric acid and were mixed with 2.88 kg. of a megnesium salt. Thereupon the neutralization step was carried out by means of ammonia to a pH value of 4.5, and 10 kg. sodium nitrate of a 99.5% solution were added. The neutralization was then continued up to a pH value of 7.5 and up to a pH value of 8.5, carbonic acid and ammonia were simultaneously introduced until the final content in carbonic acid was about 3.5% $CO_2$. The mass to be digested was highly liquid throughout the entire digesting period, and the absorption of carbonic acid and transformation took place smoothly and completely. The paste had the following composition:

| | Percent |
|---|---|
| Total N | 12.8 |
| Total $P_2O_5$ | 9.2 |
| Citrate soluble $P_2O_5$ | 9.05 |
| $K_2O$ | 5.2 |
| $H_2O$ | 21.0 |
| $CO_2$ | 3.55 |

30 kg. of a 45% potassium chloride were added to this mixture and were granulated with a three-fold quantity of already granulated dried material. The NPK fertilizer had about the following composition:

| | Percent |
|---|---|
| Total N | 11.5 |
| Total $P_2O_5$ | 8.5 |
| Citrate soluble $P_2O_5$ | 8.3 |
| $K_2O$ | 18.1 |

It is, of course, understood that the present invention is, by no means, limited to the particular methods set forth in the preceding examples but also comprises any modifications within the scope of the appended claims.

What we claim is:

1. A method of making a complex fertilizer, which includes the steps of: breaking up raw phosphate by means of nitric acid, admixing thereto magnesium sulphate ($MgSO_4$), neutralizing the thus obtained mixture up to a pH value of between 4 and 5 while adding thereto a potash salt at the latest when said mixture has reached a pH value of 4 to 5, continuing the neutralization of the thus obtained mixture up to a pH value of approximately 7.5, simultaneously introducing ammonia and carbonic acid up to a pH value of approximately 8.5, and increasing the $CO_2$ content of the mixture up to approximately 3.5% $CO_2$.

2. A method according to claim 1, in which the introduction of carbonic acid is effected at a temperature of the mixture of about 60° C.

References Cited in the file of this patent

UNITED STATES PATENTS

| | | |
|---|---|---|
| 1,849,704 | Boller | Mar. 15, 1932 |
| 1,913,791 | Carothers | June 13, 1933 |
| 1,948,520 | Harvey | Feb. 27, 1934 |
| 2,053,432 | Harvey | Sept. 8, 1936 |
| 2,611,691 | Tramm | Sept. 13, 1952 |
| 2,683,075 | Caldwell | July 6, 1954 |
| 2,726,949 | Andres et al. | Dec. 13, 1955 |
| 2,739,054 | Andres et al. | Mar. 20, 1956 |